(12) United States Patent
Teixeira da Costa

(10) Patent No.: US 6,609,359 B1
(45) Date of Patent: Aug. 26, 2003

(54) WIND MACHINE FOR HARVESTING AND GATHERING OLIVES

(76) Inventor: Miguel Pelagio Teixeira da Costa, Avenida Gonçalo Velho Cabral, Lote 8-1 C, P-2750 Cascais (PT)

(*) Notice: Subject to any disclaimer, the term of this patent is extended or adjusted under 35 U.S.C. 154(b) by 0 days.

(21) Appl. No.: 09/979,761

(22) PCT Filed: Aug. 10, 1999

(86) PCT No.: PCT/PT00/00014
§ 371 (c)(1),
(2), (4) Date: Nov. 14, 2001

(87) PCT Pub. No.: WO00/08914
PCT Pub. Date: Feb. 24, 2000

(30) Foreign Application Priority Data

Aug. 17, 1998 (PT) .............................................. 102190

(51) Int. Cl.$^7$ .............................................. A01D 46/00
(52) U.S. Cl. ...................................................... 56/328.1
(58) Field of Search ................................ 56/328.1, 329, 56/330

(56) References Cited

U.S. PATENT DOCUMENTS

| | | | | |
|---|---|---|---|---|
| 3,165,879 A | * | 1/1965 | Chapin | 56/330 |
| 3,943,688 A | * | 3/1976 | Billings | 56/328.1 |
| 3,979,891 A | * | 9/1976 | Patton | 56/328.1 |
| 4,212,148 A | * | 7/1980 | Brownlee | 56/328.1 |
| 4,648,312 A | * | 3/1987 | Schad | 416/227 A |
| 5,551,841 A | * | 9/1996 | Kamada | 415/182.1 |
| 5,622,036 A | * | 4/1997 | Hill | 56/328.1 |

FOREIGN PATENT DOCUMENTS

| | | | |
|---|---|---|---|
| DE | 3006177 A1 | * | 2/1981 |
| EP | 1070449 A1 | * | 1/2001 |
| ES | 2060492 | * | 11/1994 |
| FR | 2228421 A | * | 1/1975 |
| GB | 2115263 A | * | 9/1981 |
| PT | 91416 | * | 4/1991 |
| PT | 94709 | * | 2/1992 |
| PT | 96472 | * | 9/1992 |
| SU | 1159507 A | * | 6/1985 |
| SU | 1336979 A | * | 2/1986 |

* cited by examiner

*Primary Examiner*—Thomas B. Will
*Assistant Examiner*—Nathan Mammen
(74) *Attorney, Agent, or Firm*—Herbert Dubno

(57) ABSTRACT

An olive harvester has a nonrotatable outer cap, a rotatable inner cap which is driven by compressed air supplied to the outer cap and which generates a swirl through the olive tree below the inner cap which dislodges the olives so that they can be collected in a skirt which is fixed to the outer cap and surrounds the tree. A flexible collection pipe or sleeve at the bottom of the skirt permits the discharge of the olives to the exterior.

5 Claims, 5 Drawing Sheets

WIND MACHINE FOR HARVESTING AND GATHERING OLIVES

CROSS REFERENCE TO RELATED APPLICATIONS

This application is a national stage of PCT/PT00/00014 filed Aug. 10, 1999 and based upon Portugese national application 102190 of Aug. 17, 1998 under the International Convention.

BACKGROUND OF THE INVENTION

At present, the mechanical harvesting of olives makes use of two kinds of agricultural machines. The first kind that will be called "vibrator" holds the olive tree by the trunk and causes its fruit—the olives—to detach by means of vibration and to fall down onto the ground, more precisely onto cloths placed around the olive tree. The second kind uses vertical poles that knock the olive tree horizontally. Such poles are seated vertically on a mechanical vibrating platform. The lateral pole knocking causes the fruits of the olive tree—the olives—to fall vertically onto the cloths placed on the ground around the tree to be gathered afterwards.

In both kinds of machines, the gathering of the olives is an operation following the mechanical operation of harvest. In both kinds of machines the physical action of the machine is applied to the olive tree which is shaken or knocked.

A search of the state of the art has revealed the existence of Portuguese patents No. 91416 and No. 96472 to Verdegiglio; No. 94709 to Luis G. M. Zoio and Johanna W. V. Mourik; the U.S. Pat. No. 5,437,146 to Erickson M. C. and the German patent DE 3006177 to (PIRE) Industrie Pirelli SPA.

SUMMARY OF THE INVENTION

The machine of the present invention differs from any other kind of machine in use. It does not exert any physical action upon the tree. It produces a directed and controlled air stream of the swirl type, that causes the natural fall of the olives into a bag or skirt that belongs to the machine itself. The olives pass through the collecting pipe of the skirt into a storage container or tank that then convey the olives directly to a depot or olive press The gathering is made by the machine of the present invention.

The machine of the present invention can also be useful to harvest other kinds of fruits and even for further purposes. In effect, advantage can be taken of the generation of the low intensity swirl, for example, for the treatment of other species of trees and against any kind of plagues, by spraying the trees with any kind of suitable product, thus increasing their economical value.

The main element of the apparatus of the invention is comprised by a set of two concentric spherical caps for condensing the wind and orienting its distribution:

The external fixed spherical cap is provided with a holding hoop (externally held by a lifting machine of the crane type), with openings for supplying compressed air conveyed through a feed pipe to its inside, supplied from a motor driven air compressor. This spherical cap can be made in hard aluminum or any other suitable material.

In the external spherical cap are embedded telescopic bars for support of the skirt.

The internal spherical cap is movable around a fixing angle that connects it to the external spherical cap leaving between them a space for receiving the compressed air.

The internal spherical cap has a vane set in its external surface and a vane set in its internal surface, the external surface vanes having a larger size than the internal surface vanes.

Further to the vanes the internal spherical cap has slots or slits conveniently directed for the generation of the swirl. The internal spherical cap can be made in molded brass or plastics.

Attached all around to the outer periphery of the external spherical cap by means of holding straps is a skirt which can be made of a suitable transparent material, such as a transparent polyvinyl or other suitable material. The skirt is disposed closed all around the tree, for enclosing the swirl for sufficient time to cause the fruits (olives) to fall. The fruits are conveyed to the exterior of the skirt by means of a flexible collection pipe or sleeve.

The holding straps will have eyelets that will direct the skirt gathering threads while changing it from the tree.

Secondary Parts

The apparatus can cooperate with the following secondary parts:

A motor driven air compressor with controlled variable intensity flow.

A lifting machine (crane) for lifting and holding the two spherical caps and the skirt set over the tree—"olive tree"—and carrying the compressed air feed pipe for the spherical caps.

A wheeled stable platform (trailer) which will carry along the olive tree plantation the motor driven compressor, the lifting machine, the skirt and spherical caps set and the olive storage tank.

BRIEF DESCRIPTION OF THE DRAWING

The appended drawing shows a non-limiting example of the machine according to the invention.

SPECIFIC DESCRIPTION

Figure 1:
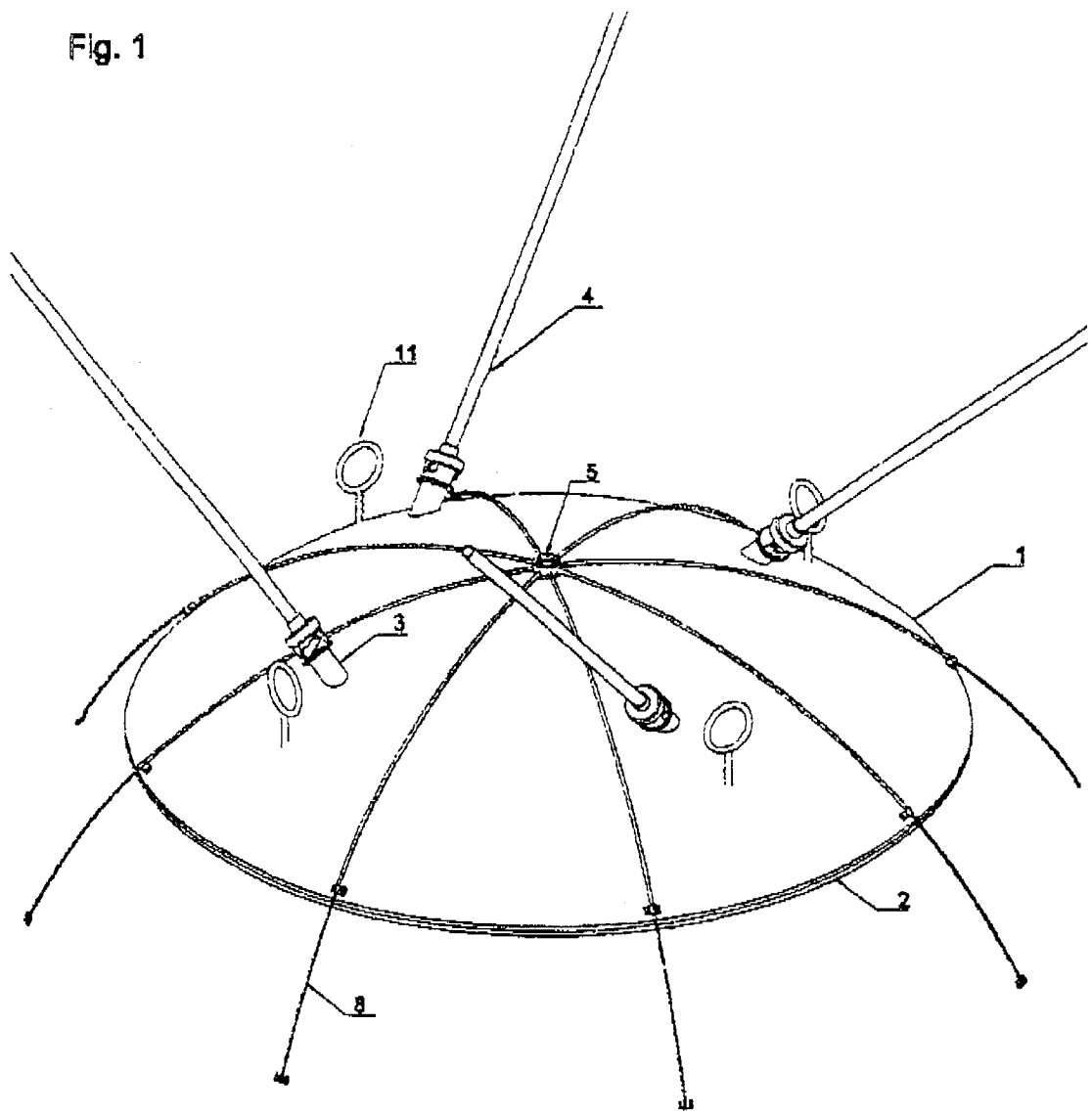
FIG. 1 is a perspective view of the external spherical cap with the telescopic bars (top view)

As can be seen from FIG. 1, the upper or external cap 1 of the olive harvester has a generally spherical shape and is provided with telescopic bars 8 which can support the skirt 9 (FIG. 5), a plurality of feed pipes 4 which communicate with the openings or passages 3 which open into the interior of the cap and holding elements in the form of spools or straps 11 which enable the cap 1 and hence the olive harvester to be supported from a crane. The connecting axle 5, which rotatably supports the internal or inner cap 2, can also be seen in FIG. 1.

Figure 2:
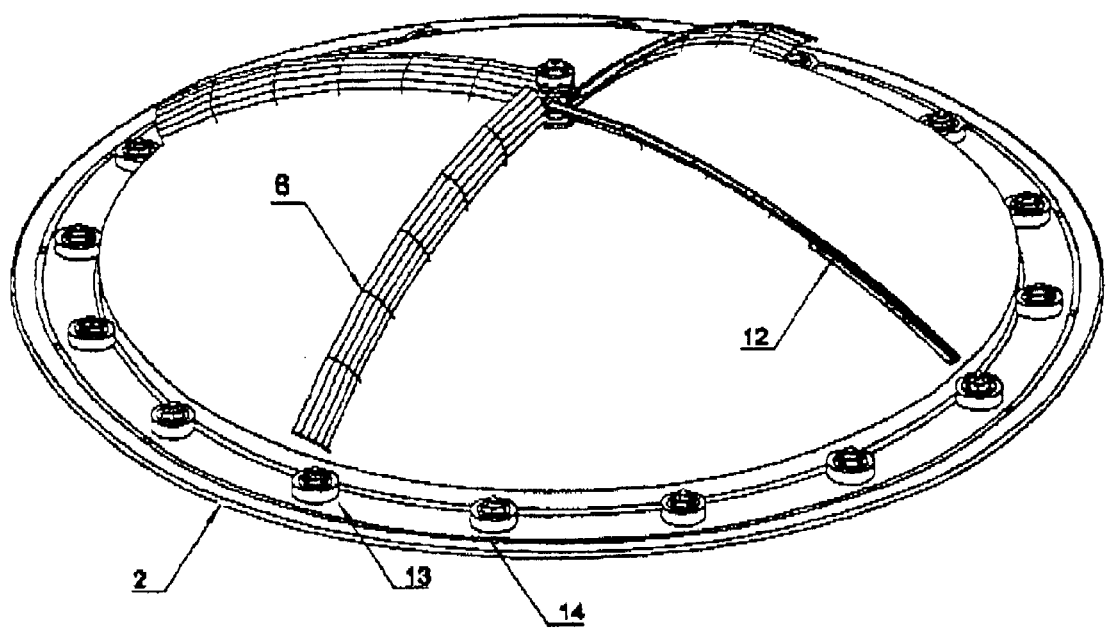
FIG. 2 is a perspective view of the internal spherical cap (top view)

From FIG. 2, it will be apparent that the inner cap 2, which is connected by the axle 5 with the outer cap 1, has on its upper surface outer vanes 6 and is formed with slots or slits 12 opening into the interior of the inner cap 2 to produce the swirl which dislodges the olives from the tree below the cap 2. The inner cap 2 also is formed with ball bearings 13 and balls 14 facilitating rotation of the inner cap within the outer cap.

Figure 3:
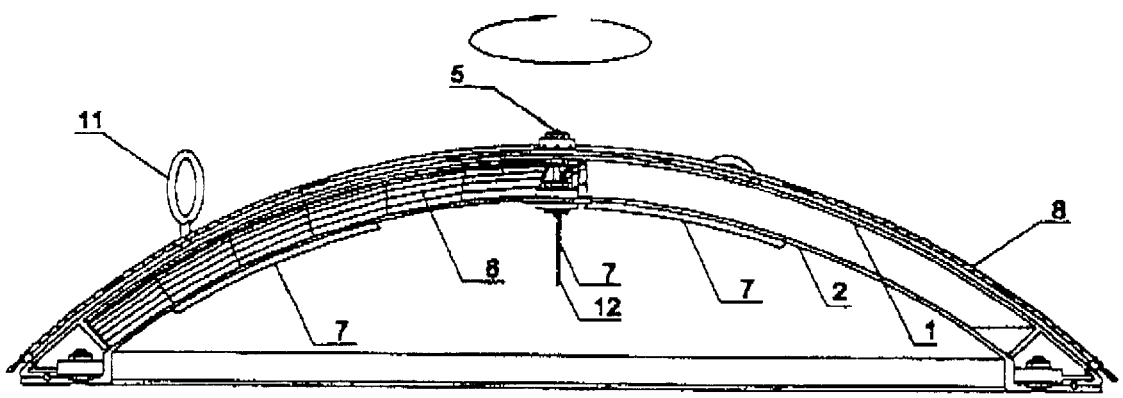
FIG. 3 is a sectional view of the spherical cap set.

The assembly of the two caps is shown in FIG. 3 and the rotatability of the inner cap is represented by the arrow.

Figure 4:
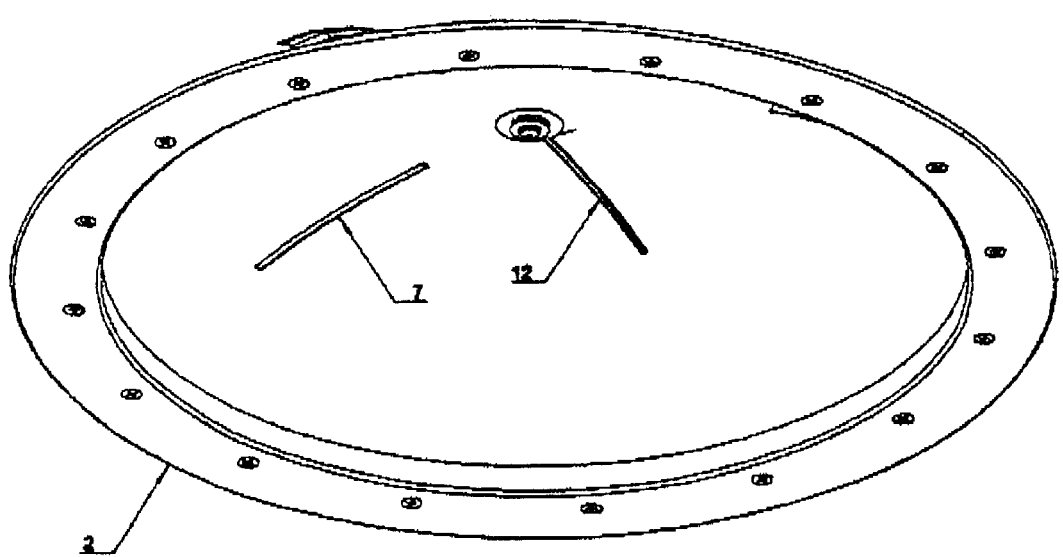
FIG. 4 is a perspective view of the internal spherical cap (bottom view)

FIG. 4 shows the underside of the inner cap 2 with its inner vanes 7 and the slots or slits 12.

Figure 5:
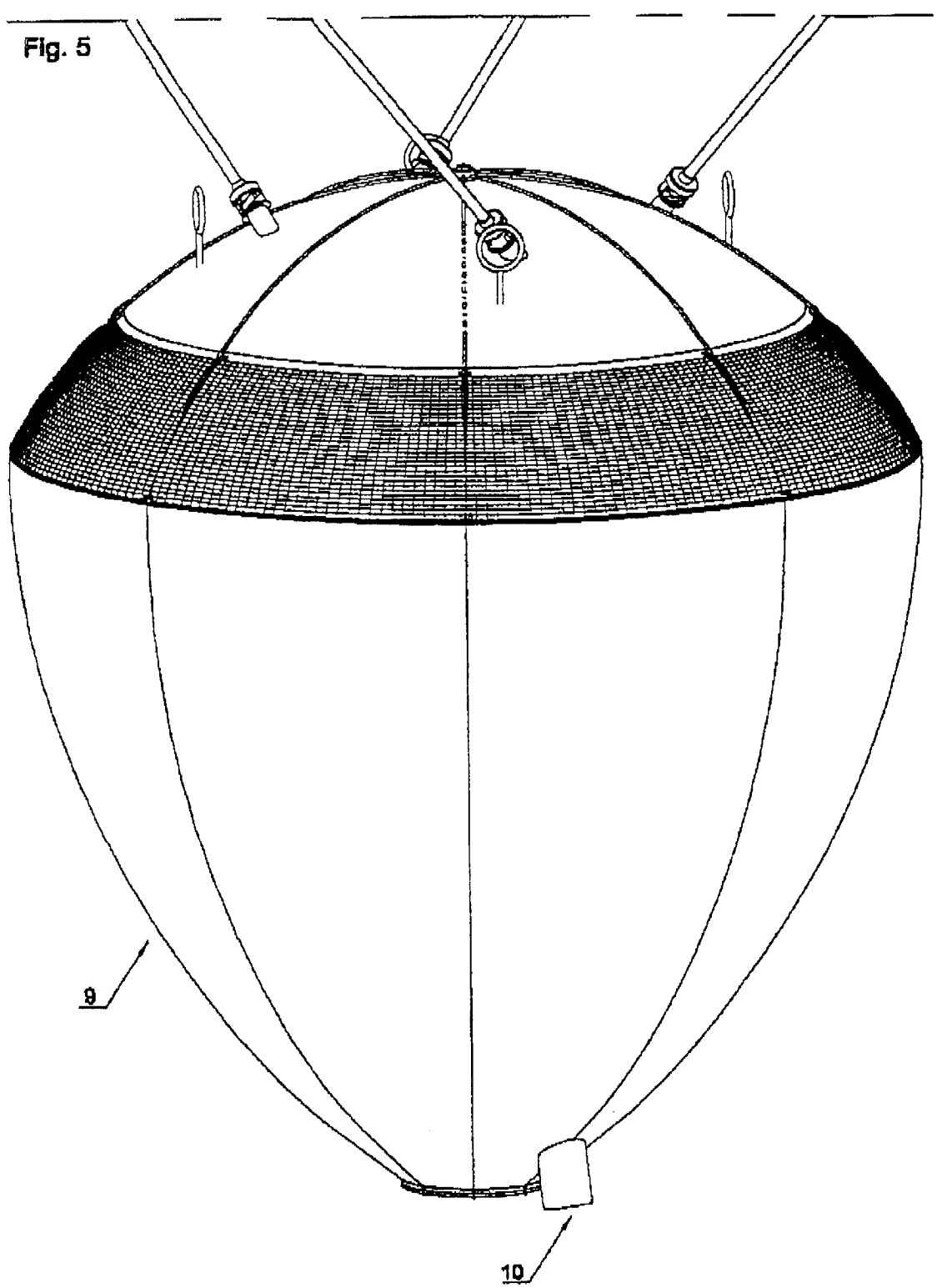
FIG. 5 is a perspective view of the bars and skirt set in the expanded condition.

From FIG. 5, it will be apparent that the skirt, supported by the telescopic bars from an upper holding hoop, can be formed near its bottom with a gathering flexible sleeve or pipe 10, also referred to as a collection pipe, to convey the olives to the storage tank and simultaneously the compressed air to the outside.

The set is placed over the tree by means of the lifting machine extending the telescopic bars 8 embedded in the external spherical cap 1 such that the area covered by the spherical caps and skirt set can be enlarged to the dimension suitable to the crown of the tree. Bars 8 are autonomously adjustable according to the irregularities of the crowns. The skirt 9 is then held and fastened onto the trunk of the tree directing the sleeve to the storage tank.

The spherical caps 1 and 2 are fed with compressed air having controlled variable pressure. When the air impacts on the outer vanes 6 of the internal spherical cap 2, this will rotate thus increasing the air pressure and the air is conveyed to the inside through the slots 12. Then the air is spread and directed in a swirl by the other inner vanes 7 of smaller size.

The swirl or windstorm thus generated inside the skirt causes the fruits (olives) to detach and fall down onto the base of the skirt 9 then leading them to the storage tank by means of the flexible pipe or sleeve 10 together with the already dissipating swirl that will leave to the outside.

Flow control will produce the swirl or windstorm in quantity, velocity and strength adequate to the harvesting operation.

The harvesting operation can be conducted by two men only.

What is claimed is:

1. An olive harvester comprising:

a nonrotating outer cap adapted to be positioned over an olive tree for harvesting olives therefrom, said outer cap having at least one pipe opening into an interior of said cap for introducing compressed air to the interior of said cap;

a rotatable inner cap below said outer cap and concentric therewith, said inner cap being connected to said outer cap by an axle enabling rotation of said inner cap relative to said outer cap, said inner cap being formed on an upper portion thereof with vanes enabling rotation of said inner cap by said compressed air, said inner cap having openings in a form of slits or slots for passing compressed air downwardly and creating a swirl of air against said tree for dislodging olives therefrom; and a skirt connected to said outer cap and extending downwardly therefrom to surround said tree and collect the olives dislodged by said swirl of air.

2. The olive harvester defined in claim 1, further comprising telescopingly extendable bars on said outer cap for supporting said skirt.

3. The olive harvester defined in claim 1 wherein said skirt is formed with a holding hoop for securing said skirt to said outer cap and with a flexible pipe for conveying collected olives to an exterior of said sleeve.

4. The olive harvester defined in claim 1 wherein said outer cap is provided with holding elements for supporting the olive harvester from a crane.

5. The olive harvester defined in claim 1 wherein said outer cap has a plurality of passages opening into the interior of said outer cap for supplying compressed air thereto.

* * * * *